Feb. 3, 1970    MASO GALBARINI ET AL    3,493,223
WORK HOLDER FOR A MILLING MACHINE
Filed Aug. 3, 1967    4 Sheets-Sheet 4
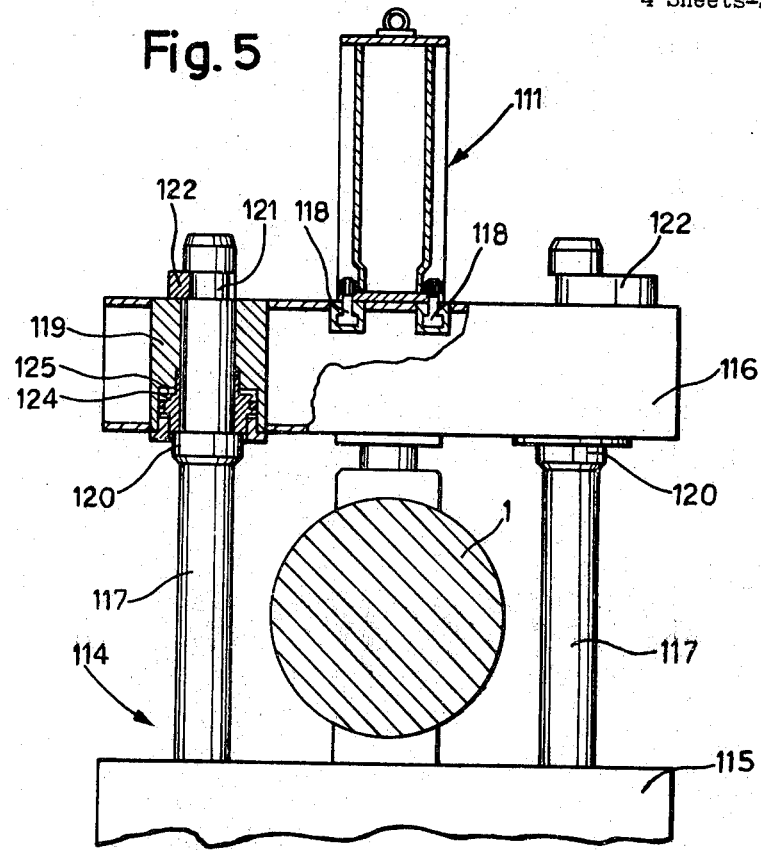
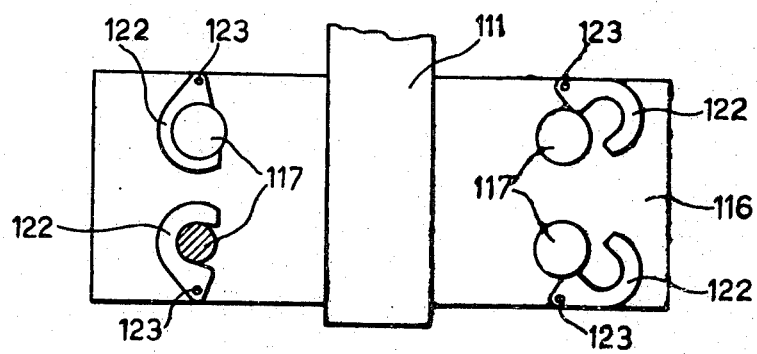

United States Patent Office 3,493,223
Patented Feb. 3, 1970

3,493,223
WORK HOLDER FOR A MILLING MACHINE
Maso Galbarini and Francesco Cotta Ramusino, Milan, Italy, assignors to Innocenti Società Generale per l'Industria Metallurgica e Meccanica, Milan, Italy
Filed Aug. 3, 1967, Ser. No. 658,218
Claims priority, application Italy, Jan. 7, 1967, 50,055-A/67
Int. Cl. B23q 3/08
U.S. Cl. 269—25                                              10 Claims

ABSTRACT OF THE DISCLOSURE

The invention relates to work holders for milling machines, which milling machines are intended to cut longitudinal slots in large cylindrical workpieces such as rotors. An object of the invention is to allow two slots to be cut at the same time by the use of two milling cutters one on each side of the workpiece. To secure the workpiece against the stresses inevitably created by such use of two milling cutters the invention provides for the use of two end supports for the workpiece of special kind. Each of these end supports comprises a bedplate and a girder and each bedplate and girder houses a fluid pressure cylinder. The cylinders of each end support act in opposite directions so that the workpiece can be clamped therebetween and there is provided a longitudinal beam which extends between top girders of the two end supports to overlie the workpiece. This beam is provided on its under-surface with a plurality of lock devices which act downwardly on the workpiece upper surface at a plurality of positions corresponding to and opposed to a like plurality of intermediate supports beneath the workpiece.

---

United States patent application Ser. No. 511,527 (filed Dec. 3, 1965), now Patent No. 3,362,295 relates to a work holder for a machine suitable for cutting slots in large cylindrical workpieces comprising, in combination with two end supports adapted to engage the ends of a horizontally extending said workpiece, a plurality of intermediate supports adapted to engage the workpiece during its milling and, arranged in alternation therewith, a plurality of cradle supports also adapted to engage the workpiece while both permitting angular displacement thereof about its longitudinal axis and effecting limited vertical displacements thereof, one said cradle support at least being provided with driving means adapted to effect rotation of the workpiece about its axis. In the region of a said end support the workpiece is provided with an indexing device and the slots are cut by means of a machine comprising a milling-cutter slidably mounted on guides which extend parallel with the longitudinal axis of the workpiece.

With such a work holder it is possible to effect accurate positioning of the workpiece, to displace it angularly and subsequently to lock it for cutting of the various slots.

An obvious improvement on the disclosures of the above-mentioned U.S. application consists in simultaneously cutting two opposite slots by means of two symmetrical milling-cutters, arranged to be movable over parallel guideways arranged one on each side of the workpiece. The adoption of two milling-cutters however prevents the use of end supports of the previously described type, as these would interfere with the movements of the second milling cutter. Moreover, during the simultaneous cutting of two slots, the workpiece is subjected to high stresses and these necessitate the provision of further end supports, end supports according to the previously proposed constructions being no longer sufficient.

It is an object of the present invention to solve the abovementioned problems by providing a work holder according to the above-mentioned U.S. application, wherein the supports for the workpiece conveniently admit the free movement of milling cutters situated on either or both sides of the workpiece.

A further object of the invention is to provide a work holder of the above-mentioned type, wherein the workpiece can be locked at various intermediate positions in addition to at its ends, in order to improve the stability of the workpiece and make it capable of withstanding, without displacement, the higher stresses encountered as a result of the combined action of two milling cutters.

A still further object of the invention is to provide a work holder of the above-mentioned type, which provides for the quick release of a workpiece from the various components of the holder as a result of the facility for rapid assembly and disassembly of the workpiece end supports and locking positions.

According to these and other objects, the invention consists in a work holder for a milling machine suitable for cutting longitudinal slots in large cylindrical workpieces according to U.S. application Ser. No. 511,527, filed Dec. 3, 1965, wherein the two end supports adapted to support and lock the two end portions of the workpiece each comprise a bedplate and a top girder, the bedplate and girder of each said support being interconnected by vertical columns and each provided with oppositely acting cylinders adapted to lock the workpiece, the said top girders of the said end supports having secured thereto a mechanically strong longitudinal beam which overlies the workpiece and is provided on its under surface with lock devices adapted to act downwardly on the workpiece upper surface at a plurality of positions corresponding to the location of a like plurality of stationary supports arranged beneath the workpiece.

These and other objects and advantages will be clear from the accompanying drawings which are given by way of example and in which:

FIG. 5 is a cross sectional view taken along line V—V of FIG. 3; and

FIG. 6 is a plan view of the detail shown in FIG. 5.

Figure 1:
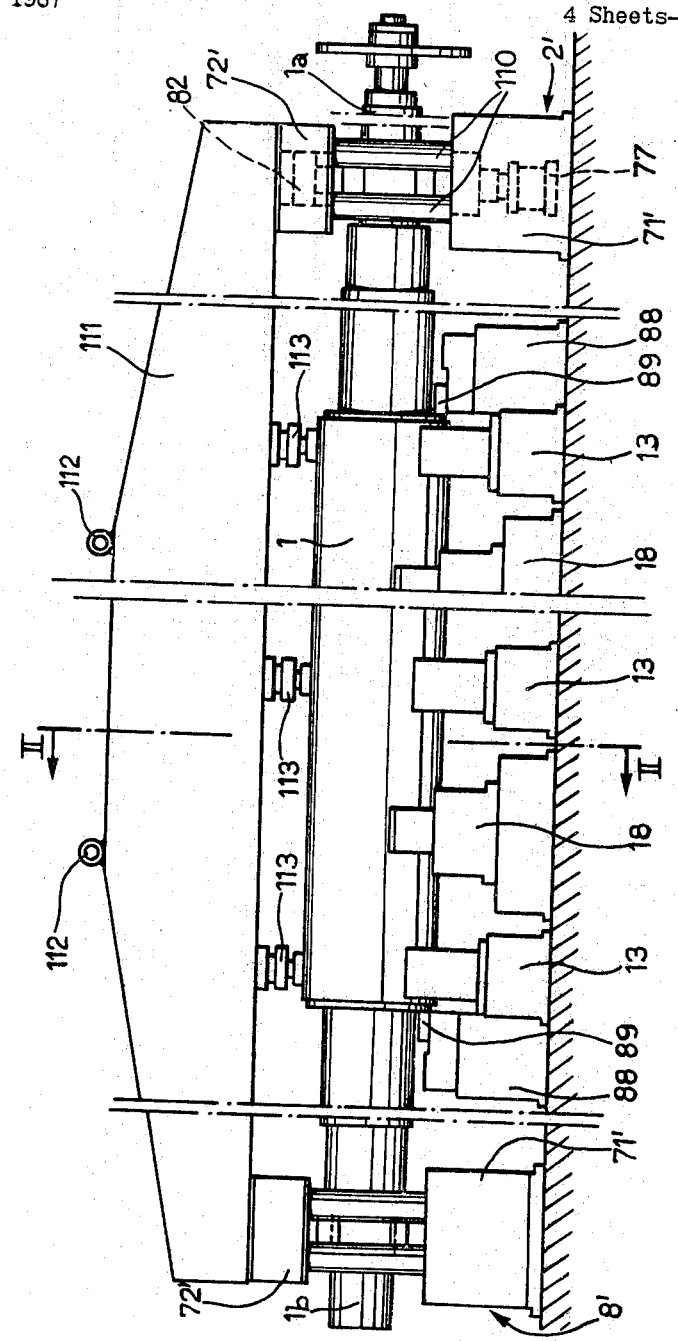
FIG. 1 is a side elevational view of a work holder according to the present invention.
Figure 2:
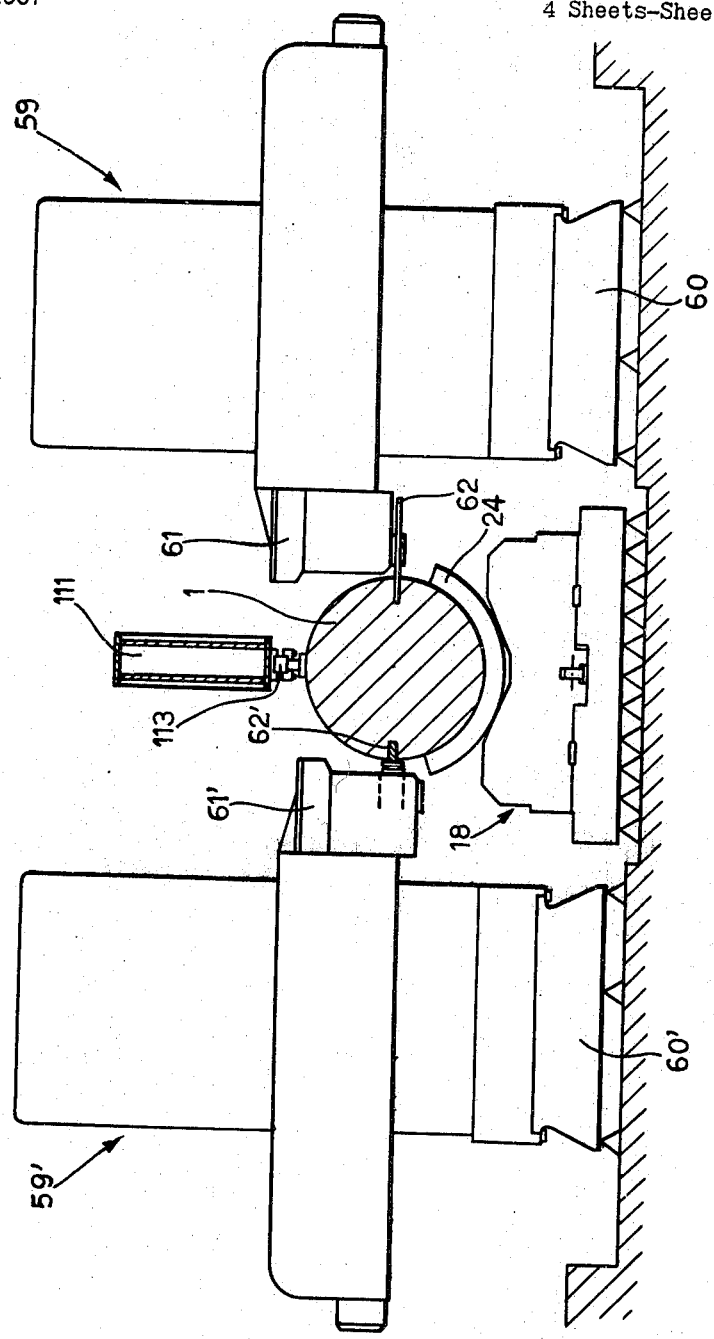
FIG. 2 is a cross sectional view taken along line II—II of FIG. 1.

According to the above-mentioned U.S. patent application, and as shown in FIGS. 1 and 2 of the drawings a workpiece 1 rests on a plurality of intermediate supports 13 which alternate with cradle supports 18 all or some of which are provided with means for effecting angular displacement of the workpiece about its longitudinal axis. A rolling sector 24 is also provided in accordance with the said disclosures.

Axial lock members are arranged one near each of the opposite ends 1a, 1b of the workpiece and these locks each comprise a bedplate 88 and a pusher member 89.

In accordance with the invention, the two ends 1a, 1b of the workpiece, which are generally reduced in diameter with respect to the intermediate portion to be machined, are engaged by special end supports 2', 8' which replace the supports normally employed for this purpose. The said two end supports 2', 8' each comprise a bedplate 71' and a top girder 72' connected to the bedplate by vertical pillars 110. Each end support is provided with a pair of oppositely directed fluid pressure cylinders 77, 82, the bedplate and girder of each end support each incorporating one cylinder of the associated pair. The said cylinders are operative either to lock the workpiece angularly while allowing vertical displacements thereof (when the cylinders of a pair are fed in parallel at the same pressure), or to lock the workpiece completely (when the top cylinder 82 only of each pair is fed).

A beam 111 is secured to the top girders 72' of the two end supports 2', 8', this beam extending longitudinally above the workpiece and being provided with eyes 112 by means of which it may be lifted by a crane. As shown, the said beam has secured to its bottom face a plurality of intermediate lock devices, such as fluid pressure cylinders 113, which are adapted to lock the workpiece 1 from above onto the stationary intermediate supports 13.

With the above arrangement two slots can be simultaneously cut in the workpiece 1 by employing two separate milling machines which respectively each comprise an upright 59, 59' (FIG. 2) slidably mounted on a longitudinal guideway 60, 60', the two guideways extending parallel with the axis of the workpiece one on either side thereof. Each said upright 59, 59' is respectively provided with an adjustable rod head 61, 61' which carries respectively a suitable milling cutter 62, 62'.

Figure 4:
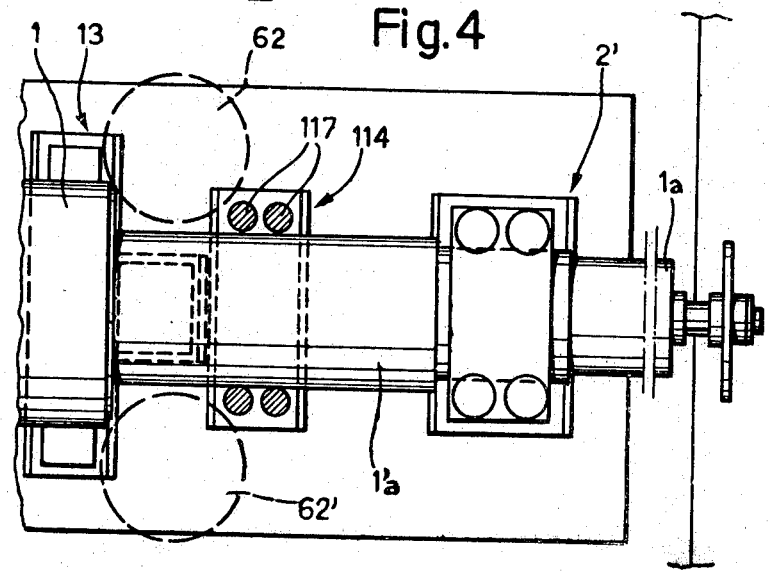
FIG. 4 is a plan view of the detail shown in FIG. 3.

Both cutters 62, 62' may as shown in FIG. 4, be operated without interference from the end supports. Furthermore, the lock devices 113 enhance the stability of the workpiece 1 and oppose the higher stresses which derive from the combined action of the two milling machines when operating simultaneously.

When very large workpieces are being handled and when the length of their end portions (denoted 1'a in FIGS. 3 and 4) is such as to require an excessively long traverse, it is convenient to employ two supports at each workpiece end as shown in FIGS. 3, 4, 5 and 6. In this case, in addition to the end supports 2', 8', two auxiliary supports 114 are employed, the said supports 114 being substantially similar to the end supports 2', 8' but without fluid pressure cylinders. As shown, the auxiliary supports 114 each comprise a bedplate 115 connected by vertical pillar 117 to a top transverse girder 116. The longitudinal beam 111 is in this case secured to the top girders 116 of the two said auxiliary supports 114.

Figure 3:
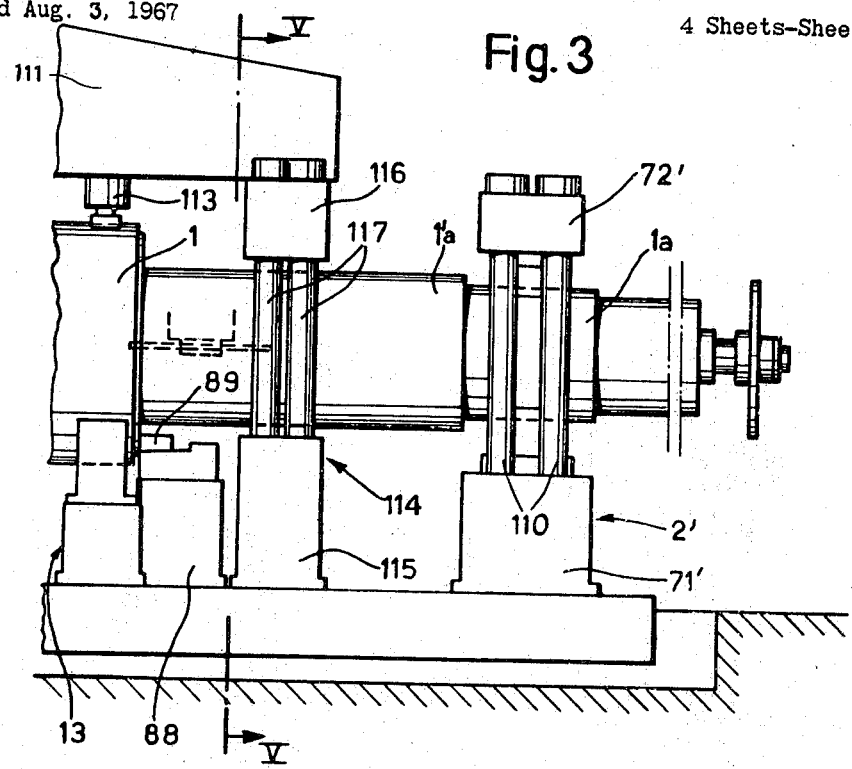
FIG. 3 is a side elevational view of an end support of a modified work holder.

In both cases considered, e.g. in the embodiments of both FIGS. 1 and 3, the beam 111 is fully lifted, for instance by means of a crane, for removal of a workpiece from or fitting of a workpiece to, the work holder. It is therefore necessary for the girders 72' or 116 of the end supports 2', 8' and auxiliary supports 114 respectively, with which the beam 111 is connected, to be displaceable jointly with the said beam and quickly connected to or disconnected from, the supporting pillars 110 or 117 respectively. Rapid action locking means are therefore provided for engaging the said girders with or disengaging them from, the supporting pillars by a simple and quick operation.

FIGS. 5 and 6 show an example of such rapid action locking means when used for assembly of the longitudinal beam 111 on the auxiliary supports 114. Each end of the beam 111 is permanently secured, for instance by stud bolts 118 to a said top girder 116 of a said support. Each said girder 116 rests on abutment collars 120 which are carried by the pillars 117 and each girder is provided at its top surface with a plurality of hooks 122 which are rotatably mounted on vertical pins 123, one said hook being associated with each column 117 of the support. As shown in FIG. 5, the hooks 122 engage suitably dimensioned grooves 121 in the tops of the pillars thereby rigidly to connect the girder and pillars together. In this way the beam is able to withstand the upward stresses which are created by locking of the workpiece along its length.

Since a lock of this kind is unavoidably subject to a certain amount of play, and in order to avoid undue uncontrolled movements of the beams during operation of the lock devices 113, provision is made for the hook and groove action to be made permanent. This can be achieved, for instance, by arranging, around that portion of each pillar 117 which is engaged by a bushing 119 in the top girder 116, a fluid pressure cylinder comprising a chamber 125 formed in the bushing 119 and an annular piston 124 which is slidable in the said chamber and which encircles the pillar. On feeding of fluid to the top chamber in the cylinder the piston will react against the abutment collar 120 thereby positively to lock the girder 116 to the pillar 117. Subsequent operation of the lock devices 113 on the workpiece will then cause no uncontrolled displacement of the beam, and hence also none of the workpiece.

Operation of the rapid action hooks 122 may be effected manually simply by rotating the hooks about their pivots 123 thereby to cause them to engage, or become disengaged from, the grooves 121 in the pillars.

Various modifications of the present invention are of course possible within the scope of the appended claims.

What we claim is:

1. Work holder for a milling machine suitable for cutting opposed longitudinal slots in a large cylindrical workpiece comprising end support means which are adapted to support and lock the two end portions of the said workpiece, each of said end support means comprising bedplate means and top girder means interconnected by a plurality of vertical columns, fluid pressure cylinder means on said bedplate means and said girder means for locking the workpiece in position, longitudinal beam means extending between and secured by its ends to said girder means of the said end support means and said longitudinal beam means being provided on its under surface with a plurality of lock devices adapted to act downwardly on the workpiece upper surface and a plurality of stationary supports being provided beneath the workpiece at a plurality of positions corresponding to the locations of said lock devices on the said beam.

2. Work holder as claimed in claim 1, wherein said end support means at each end of said workpiece is comprised of a main end support and an auxiliary support, the said auxiliary supports serving to support the said longitudinal beam means at its ends and the said auxiliary supports each comprising a bedplate and a top girder interconnected by vertical columns.

3. Work holder as claimed in claim 1, wherein said top girder means of the said end support means to which the said longitudinal beam means is secured are provided with rapid action locking and unlocking means whereby they may be locked or unlocked with respect to the supporting columns to thereby facilitate lifting of the said girder means together with the said beam means.

4. Work holder as claimed in claim 2, wherein the said top girders of the said auxiliary supports to which the said longitudinal beam is secured are provided with rapid action locking and unlocking means with respect to the said supporting columns thereby to enable lifting of the said girders together with the said beam.

5. Work holder as claimed in claim 4, wherein the said locking and unlocking means comprise hooks which are rotatably mounted about vertical pivots provided on the top faces of the said girders and adapted to engage annular groove sformed in the said supporting columns.

6. Work holder as claimed in claim 3, wherein the said locking and unlocking means comprise hooks which are rotatably mounted about vertical pivots provided on the top faces of the said girder means and adapted to engage annular grooves formed in the said supporting columns.

7. Work holder as claimed in claim 1, wherein the said top girder means are provided with auxiliary lock means adapted to take up any play between the girders and their respective vertical columns.

8. Work holder as claimed in claim 2, wherein the said top girders are provided with auxiliary lock means adapted to take up any play between the girders and their respective vertical columns.

9. Work holder as claimed in claim 8, wherein the said auxiliary lock means comprise, in association with each said vertical column, a fluid pressure cylinder comprising a chamber formed in the top girder and an annular piston slidable in the said chamber and surrounding said column the said piston reacting, on supply of pressure fluid to the said cylinder, against an abutment collar formed fast with the associated said column.

10. Work holder as claimed in claim 7, wherein the said auxiliary lock means comprise, in association with each said vertical column, a fluid pressure cylinder comprising a chamber formed in the top girder and an annular piston slidable in the said chamber and surrounding said column the said piston reacting, on supply of pressure fluid to the said cylinder, against an abutment collar formed fast with the associated said column.

References Cited

UNITED STATES PATENTS

| | | | |
|---|---|---|---|
| 963,348 | 7/1910 | Wood | 269—35 X |
| 3,094,958 | 6/1963 | Gruetjen | 269—32 X |

ROBERT C. RIORDON, Primary Examiner

LEON GILDEN, Assistant Examiner

U.S. Cl. X.R.

269—152